(12) United States Patent
Miller et al.

(10) Patent No.: US 8,903,595 B2
(45) Date of Patent: Dec. 2, 2014

(54) ALTERNATOR AND STARTER TESTER WITH INCREASED LOAD AND CABLE IDENTIFICATION

(71) Applicants: Garret Miller, Owatonna, MN (US); Eric VandeZande, Owatonna, MN (US); Chad Samp, Albert Lea, MN (US)

(72) Inventors: Garret Miller, Owatonna, MN (US); Eric VandeZande, Owatonna, MN (US); Chad Samp, Albert Lea, MN (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 0 days.

(21) Appl. No.: 13/621,405

(22) Filed: Sep. 17, 2012

(65) Prior Publication Data

US 2014/0081527 A1    Mar. 20, 2014

(51) Int. Cl.
*G01M 17/00* (2006.01)

(52) U.S. Cl.
CPC ..................................... *G01M 17/00* (2013.01)
USPC ..... 701/29.1; 701/29.8; 702/183; 235/462.13

(58) Field of Classification Search
CPC ............................... G01R 1/067; G01M 17/00
USPC ............. 701/29.1, 29.8; 702/183; 235/462.13
See application file for complete search history.

(56) References Cited

U.S. PATENT DOCUMENTS

| | | | |
|---|---|---|---|
| 1,313,061 A | 8/1919 | Brown | |
| 2,578,694 A | 12/1951 | Goldman | |
| 3,745,456 A | 7/1973 | Kahler | |
| 3,893,029 A | 7/1975 | Vensel et al. | |
| 3,903,737 A | 9/1975 | Burden et al. | |
| 3,936,744 A | 2/1976 | Perlmutter | |
| 4,070,624 A | 1/1978 | Taylor | |
| 4,500,304 A | 2/1985 | Foster | |
| 4,641,534 A | 2/1987 | Schneider et al. | |
| 4,666,122 A | 5/1987 | Goodard | |
| 4,781,665 A | 11/1988 | Walker | |
| 4,832,666 A | 5/1989 | Henderson | |
| 4,849,665 A | 7/1989 | Kitamura et al. | |
| 4,867,427 A | 9/1989 | Cunningham | |
| 4,945,272 A | 7/1990 | Ochi et al. | |
| 4,980,589 A | 12/1990 | Ochi et al. | |
| 5,040,493 A | 8/1991 | Gajewski et al. | |
| 5,125,376 A | 6/1992 | Williams et al. | |
| 5,156,573 A | 10/1992 | Bytzek et al. | |
| 5,195,366 A | 3/1993 | Duncan | |
| 5,473,208 A | 12/1995 | Stihi | |
| 5,541,840 A | 7/1996 | Gurne et al. | |
| 5,550,485 A * | 8/1996 | Falk | 324/765.01 |
| 5,568,916 A | 10/1996 | Gibbons et al. | |
| 5,689,517 A | 11/1997 | Ruparel | |

(Continued)

FOREIGN PATENT DOCUMENTS

EP    0039122 A2    11/1981

OTHER PUBLICATIONS

International Search Report and Written Opinion dated Apr. 26, 2013 for PCT/US2013/027108 filed Feb. 21, 2013.

*Primary Examiner* — Mary Cheung
*Assistant Examiner* — Brian P Sweeney
(74) *Attorney, Agent, or Firm* — Baker & Hostetler LLP

(57) ABSTRACT

An alternator and starter tester system capable of generating a warranty claim code. The warranty claim code can contain information regarding a diagnostic test and the tested components. The alternator and starter tester system can also encode and transmit the warranty claim code to a supplier or a manufacturer to verify warranty credit.

10 Claims, 8 Drawing Sheets

(56) References Cited

U.S. PATENT DOCUMENTS

| | | |
|---|---|---|
| 5,701,089 A | 12/1997 | Perkins |
| 5,705,870 A | 1/1998 | Thomsen et al. |
| 5,718,196 A | 2/1998 | Uchiyama et al. |
| 5,816,568 A | 10/1998 | Fox |
| 5,938,169 A | 8/1999 | Ogawa et al. |
| 6,009,363 A | 12/1999 | Beckert et al. |
| 6,026,461 A | 2/2000 | Baxter et al. |
| 6,147,426 A | 11/2000 | Lepi et al. |
| 6,175,789 B1 | 1/2001 | Beckert et al. |
| 6,181,922 B1 | 1/2001 | Iwai et al. |
| 6,226,305 B1 | 5/2001 | McLoughlin et al. |
| 6,276,194 B1 | 8/2001 | Vinton et al. |
| 6,292,931 B1 | 9/2001 | Dupenloup |
| 6,304,012 B1 | 10/2001 | Chen et al. |
| 6,304,016 B1 | 10/2001 | Frederick et al. |
| 6,394,250 B1 | 5/2002 | Ouchi |
| 6,466,025 B1 | 10/2002 | Klang |
| 6,480,723 B1 | 11/2002 | Davidson et al. |
| 6,553,039 B1 | 4/2003 | Huber et al. |
| 6,634,896 B1 | 10/2003 | Potega |
| 6,647,027 B1 | 11/2003 | Gasparik et al. |
| 6,674,046 B2 | 1/2004 | Bankstahl et al. |
| 6,687,263 B2 | 2/2004 | van Oldenborgh et al. |
| 6,704,829 B1 | 3/2004 | Hoshi et al. |
| 6,738,696 B2 | 5/2004 | Oi |
| 6,777,945 B2 | 8/2004 | Roberts et al. |
| 6,791,332 B2 | 9/2004 | Raichle |
| 6,803,748 B2 | 10/2004 | Peter |
| 6,834,631 B1 | 12/2004 | Blackburn et al. |
| 6,895,809 B2 | 5/2005 | Raichle |
| 6,986,292 B2 | 1/2006 | Kemnade |
| 7,134,325 B2 | 11/2006 | Krampitz et al. |
| 7,150,186 B2 | 12/2006 | Murphy et al. |
| 7,152,464 B2 | 12/2006 | Krampitz et al. |
| 7,212,911 B2 | 5/2007 | Raichle et al. |
| 7,246,015 B2 | 7/2007 | Bertness et al. |
| 7,472,820 B2 | 1/2009 | Krampitz et al. |
| 7,640,795 B2 | 1/2010 | Raichle |
| 7,690,573 B2 | 4/2010 | Raichle et al. |
| 7,696,759 B2 | 4/2010 | Raichle et al. |
| 2002/0056056 A1 | 5/2002 | Bannatyne et al. |
| 2002/0077781 A1 | 6/2002 | Liebl et al. |
| 2004/0104728 A1 | 6/2004 | Bertness et al. |
| 2004/0163501 A1 | 8/2004 | Chen |
| 2004/0227523 A1 | 11/2004 | Namaky |
| 2004/0251907 A1 | 12/2004 | Kalley |
| 2005/0088304 A1 | 4/2005 | Hines et al. |
| 2005/0174292 A1 | 8/2005 | McFarland et al. |
| 2006/0119365 A1 | 6/2006 | Makhija |
| 2006/0136119 A1 | 6/2006 | Raichle et al. |
| 2007/0152702 A1* | 7/2007 | Raichle et al. ............... 324/772 |
| 2007/0294001 A1 | 12/2007 | Underdal et al. |
| 2008/0023547 A1* | 1/2008 | Raichle et al. ............ 235/462.13 |
| 2008/0249681 A1 | 10/2008 | Bertosa et al. |
| 2009/0300257 A1 | 12/2009 | Vossen |
| 2010/0170944 A1 | 7/2010 | Raichle et al. |
| 2011/0015823 A1 | 1/2011 | Bertosa et al. |

\* cited by examiner

ALTERNATOR AND STARTER TESTER WITH INCREASED LOAD AND CABLE IDENTIFICATION

FIELD OF THE DISCLOSURE

The present invention pertains to the field of testing vehicle motor rotary accessory devices. More particularly, the present invention relates to devices for testing alternators or starter motors wherein the devices include high test load and test leads identification capabilities.

BACKGROUND OF THE DISCLOSURE

It is well known in the vehicle industry that certain rotary accessory devices are often used in connection with vehicle motors. Two such accessory devices are alternators and starter motors. Alternators are used in connection with an engine and are typically belt driven by the engine. Alternators have internal components, which when rotated supply electrical power to a vehicle and/or an engine. Alternators are typically removable but rigidly mounted via a bracket to the engine block or the chassis of the vehicle. In many cases, where a standard type of alternating mounting arrangement is used, the alternator has "ears" with holes that are mounted onto a post or bolt attached to the vehicle. This permits pivoting of the alternator so that the alternator can be pivoted around the post against the belt tension in order to install and remove belts, and provide a suitable tension when the belt is installed.

Starter motors are electrical motors, which are typically removable but rigidly mounted to an engine or transmission casing. The starter motor has an electrically driven pinion gear extending from the starter motor that engages a component (typically gears on the flywheel of the engine) in order to be able to rotate the crankshaft of the engine to start it. There is a wide range of attachment mechanisms for attaching the described starter motor.

It is often desirable to test alternators and/or starter motors at locations where they have been removed from the vehicle, e.g., on a test bench. However, the current alternator and starter testers include many test leads that have to be coupled to the test alternators and/or starter motors. The current alternator and starter testers do not have an effective way to verify whether the test leads including any adapters are functioning properly. Also, current alternator and starter testers do not have an effective way to verify whether the proper test leads are coupled to the proper connections of the test alternators and/or starter motors. Defective test leads will lead to alternators and/or starter motors being found faulty or defective during testing. Also, improper coupling of the test leads may cause false faulty or defective condition during testing. Thus, it would be desirable to have the alternator or starter tester to include an alternator cable check to prevent false defects.

Conventional alternator and starter tester may test alternators and/or starter motors by activating an output and then connect a test load to draw current from the tested alternators and/or starter motors to verify that an output voltage potential may be maintained. However, conventional alternator and starter tester uses a low current test load due to limitations of motor power to spin the alternators and/or starter motors and heat generated by the test load. The low current test load may not be able to detect faults within the test alternators and/or starter motors because of a small variation of output voltage potential. Thus, it would be desirable to have an alternator or starter tester to increase test load in order to accurately detect faults within the test alternator or starter motor tester.

SUMMARY OF THE DISCLOSURE

The foregoing needs are met, to a great extent, by the present disclosure, wherein in one aspect, an apparatus is provided that in some embodiments an alternator and starter motor tester includes a warranty claim code.

In accordance with one embodiment of the present disclosure, a diagnostic tool configured to testing the performance of a component of a vehicle is provided. The diagnostic tool may include a processor configured to process test information from an alternator component of the vehicle and control and activate the alternator component of the vehicle having identification information to be tested. Also, the diagnostic tool may include a memory configured to store the test information of the alternator component and software that operates the alternator component of the vehicle. Further, the diagnostic tool may include at least one test adapter and power lead comprising an identification element coupled to the alternator component, wherein the memory and the at least one test adapter and power lead are in communication with the processor.

In accordance with another embodiment of the present disclosure, a diagnostic tool configured to testing the performance of a component of a vehicle is provided. The diagnostic tool may include a processor configured to process test information from a starter motor component of the vehicle and control and activate the starter motor component of the vehicle having identification information to be tested. Also, the diagnostic tool may include a memory configured to store the test information of the starter motor component and software that operates the starter motor component of the vehicle. Further, the diagnostic tool may include at least one test adapter and power lead comprising an identification element coupled to the starter motor component, wherein the memory and the at least one test adapter and power lead are in communication with the processor.

In accordance with yet another embodiment of the present disclosure is a diagnostic tool configured to testing the performance of a component of a vehicle is provided. The diagnostic tool may include a processor configured to process test information from an alternator component of the vehicle and control and activate the alternator component of the vehicle having identification information to be tested. The diagnostic tool may also include a memory configured to store the test information of the alternator component and software that operates the alternator component of the vehicle. Further, the diagnostic tool may include a variable resistive load coupled to the alternator component configured to operate at a plurality of voltage potentials, wherein the memory and the variable resistive load are in communication with the processor.

In accordance with an additional embodiment of the present disclosure a method of testing of a component of a vehicle is provided. The method may include the steps of activating an alternator component to generate test information and processing the test information from the alternator component of the vehicle. Also, the method may include the step of receiving the test information associated with the alternator component of the vehicle via an input device; and performing a diagnostic test on the alternator component. The step of performing the diagnostic test may include applying a first voltage potential to a first resistive load and applying a second voltage potential to a second resistive load coupled to the first resist load, wherein the first voltage potential and the second voltage potential are different.

In accordance with other embodiment of the present disclosure a diagnostic tool for testing the performance of a component of a vehicle is provided. The diagnostic tool may include means for processing test information from an alternator component or a starter motor of the vehicle, the means for processing controlling and activating the alternator component or the starter motor of the vehicle having identification information to be tested. Also, the diagnostic tool may include means for storing the test information of the alternator component or the starter motor component and software that operates the alternator component or the starter motor component of the vehicle. Further, the diagnostic tool may include means for coupling comprising an identification element coupled to the alternator component or the starter motor component, and wherein the means for storing and the means for coupling are in communication with the means for processing.

There has thus been outlined, rather broadly, certain embodiments of the disclosure in order that the detailed description herein may be better understood, and in order that the present contribution to the art may be better appreciated. There are, of course, additional embodiments of the present disclosure that will be described below and which will form the subject matter of the claims appended hereto.

In this respect, before explaining at least one embodiment of the present disclosure in detail, it is to be understood that the present disclosure is not limited in its application to the details of construction and to the arrangements of the components set forth in the following description or illustrated in the drawings. The present disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

DETAILED DESCRIPTION

Figure 1:
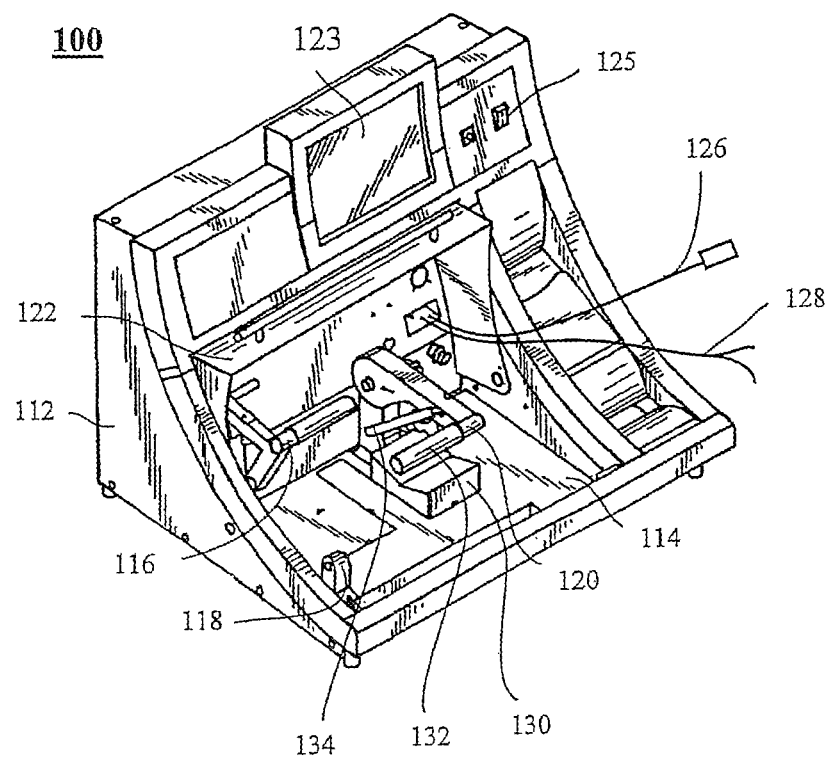
FIG. 1 is a perspective view of an alternator and starter motor tester according to an exemplary embodiment of the present invention.

The present invention will now be described with reference to the drawing figures, in which like reference numerals refer to like parts throughout. An embodiment in accordance with the present invention provides an alternator and starter motor tester for holding and testing an alternator or starter motor. The alternator and starter motor tester includes a protective hood or cover, a controller connecting an LCD touch-screen, a barcode connector, USB host and USB function connectors, an Ethernet connector, and a flash memory connector.

An embodiment of the testing apparatus is illustrated in FIG. 1. FIG. 1 illustrates an alternator and starter motor tester 100 ("tester") including a housing 112 and a base plate (or chassis) 114. The housing 112 surrounds and supports various operative components of the tester 100 including, for example, a power supply, diagnostic electronics, mounting devices, a monitor screen 123, a protective door cover 122, and the like. In one embodiment, the monitor screen 123, e.g., LCD touch-screen, may be disposed within the housing 112. A test power button 125, such as a toggle-switch, is provided on the housing 112 to activate and de-activate test power to the drive motor (not shown) and/or the transformer (not shown). A main power switch (not shown) is also used to provide power to the tester 100.

The tester 100 also includes an alternator belt tensioning arrangement generally designated 116, an alternator mounting arrangement generally designated 118, and a starter motor holder arrangement generally designated as 120. Each of the belt tensioning arrangement 116, the alternator mounting arrangement 118, and the starter motor holder arrangement 120 are mounted directly to the base plate 114.

The alternator belt tensioning arrangement 116 and the mounting arrangement 118 together hold the alternator in place for testing. An installation assembly that includes one or more mounting pins (not shown) can be placed in the mounting arrangement 118 in order to mount the alternator. The alternator can be horizontally or vertically mounted depending on the type of alternator. The pins are replaceable to allow flexibility for current and future applications.

Also shown in FIG. 1, a test adapter 126 and power leads 128 can be connected to the alternator or starter motor in order to provide test information to tester 100. Additionally, a drive belt (not shown), such as a serpentine or V-type belt or the like, can be connected to the alternator and the drive motor to simulate the operating environment in the vehicle. A gas piston may be used for belt tension to ensure consistent belt tension during testing, thereby eliminating over tensioning or belt slippage that may affect test results.

The starter motor holder arrangement 120 includes a quick release ratchet system, wherein the starter is placed on a pad and held in place by the ratchet system. The starter motor holder arrangement 120 includes, a support pad 130, a handle 132 and a release lock 134 that when operated engages and disengages a lock (pawl, for example) from a ratchet (both not shown). The starter motor holder arrangement 120 helps to eliminate the use of straps, and alternatively uses the quick ratchet to hold the starter without the need of any additional holding mechanism or end user assistance during the test. Thus, the aforementioned arrangement makes the loading and unloading of components to be tested much more efficient. The starter motor may be placed on the support pad 130 for testing. Upon the placement, the operator squeezes the release lock and presses down on the handle 132 to engage the starter motor and then releases the lock so that the lock is again reengaged. The starter motor may be powered by a transformer (not shown) in order to simulate operating environments. The transformer may be powered by an external power source and may provide test power to the starter motor via a heavy duty cable and clamps. Power leads 128, including, for example, battery lead, ground lead, solenoid lead and sense lead are connected to the starter motor in order to conduct the tests.

FIG. 1 also illustrates the monitor screen 123 that can operate as a touch-screen LCD user interface that communicates with a controller (discussed below) as well as to display information to the end user. The present invention also utilizes an on-line tutorial for quickly training new personnel on the unit's functionality and on-line help screens to help new users navigate and test components during a test. The monitor screen 123 may offer step-by-step instructions for setting up the tester 100 and conducting tests. The monitor screen 123 may also display on-screen hook up diagrams and a specification library database, which eliminate the need for paper flipcharts and enables software updates for new alternator applications or starter configurations. This database can be updated by compact flash, flash drive, other memory media or remotely via a network connection (discussed below). The monitor screen 123 may allow end users to run advertising screens when the tester is not in use. These screens can be uploaded to the tester 100 from an end user's network server or uploaded from a compact flash or other memory media. Additionally, the monitor screen 123 may be capable of displaying information in various updatable languages.

The tester 100 may output "Good/Bad" or "Pass/Fail" results to the end user. An end user printout that details test results and provides technical advice for other potential problems can be provided to the end user.

Figure 2:
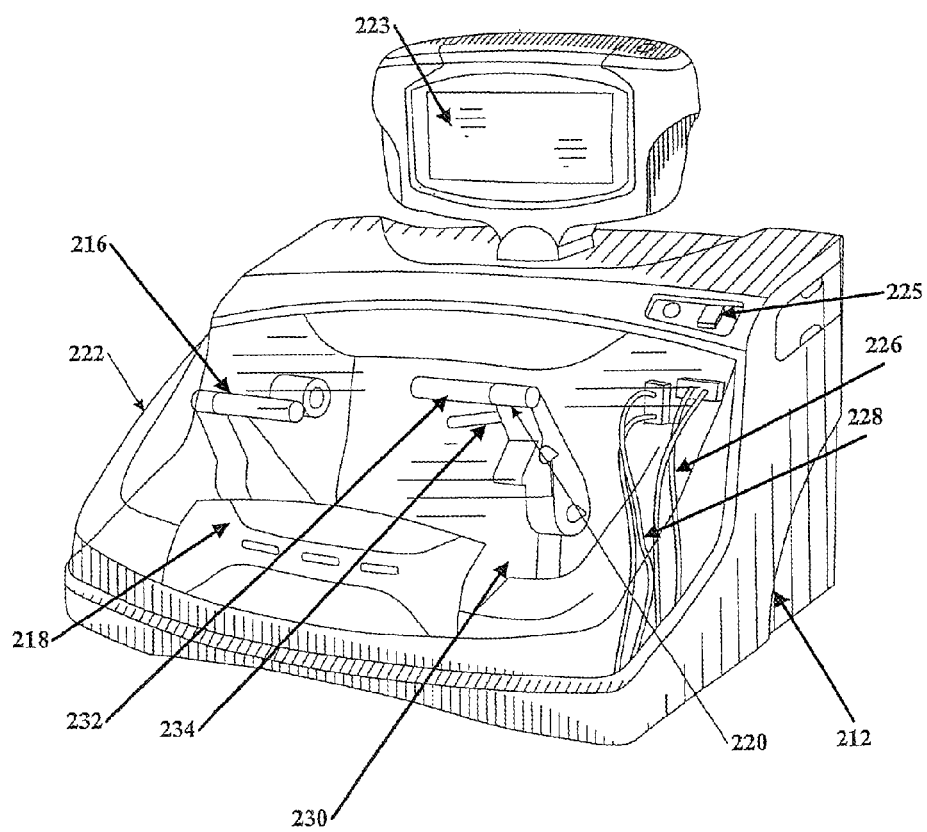
FIG. 2 is a perspective view of the alternator and starter motor tester according to an exemplary embodiment of the present invention.

Turning now to FIG. 2, a perspective view of the alternator and starter motor tester 200 according to another exemplary embodiment of the present disclosure is illustrated. The alternator and starter motor tester 200 ("tester") has components similar to the tester 100 depicted in FIG. 1, however it has an alternative design. For example, tester 200 includes a housing 212 and a base plate (or chassis) 214. The housing 212 surrounds and supports various operative components of the tester 200 including, for example, a power supply, diagnostic electronics, mounting devices, a monitor screen 223, a protective door cover 222, and the like. In the embodiment depicted, the monitor screen 223, is an LCD touch-screen disposed within the housing 212. A power button 225, such as a toggle-switch design, is provided on the housing 212 to activate or deactivate test power to the driver motor (not shown) and/or the transformer (not shown). A main power switch (not shown) is also used to provide power to the tester 200.

The tester 200 also includes an alternator belt tensioning arrangement generally designated 216, an alternator mounting arrangement generally designated 218, and a starter motor holder arrangement generally designated as 220. Each of the belt tensioning arrangement 216, the alternator mounting arrangement 218, and the starter motor holder arrangement 220 are mounted directly to the base plate 214.

The test adapters 126 and power leads 128 may be connected to the alternator or starter motor in order to provide test information to tester 200. Additionally, a drive belt (not shown), such as a serpentine or V-type belt or the like, can be connected to the alternator, the motor of the alternator and drive motor to simulate the operating environment in the vehicle. A gas piston may be used for belt tension to ensure consistent belt tension during testing and thereby eliminating over tensioning or slipping belts that may affect test results.

The starter motor holder arrangement 220 includes a quick release ratchet system, wherein the starter is placed on a pad and held in place by the ratchet system. The starter motor holder arrangement 220 includes, a support pad 230, a handle 232 and a release lock 234 that when operated engages and disengages a lock (pawl, for example) from a ratchet (both not shown). The starter motor holder arrangement 220 helps to eliminate the use of straps, and alternatively uses the quick ratchet to hold the starter without the need of any additional holding mechanism or end user assistance during the test. Thus, the aforementioned arrangement makes the loading and unloading of components to be tested much more efficient. The starter motor may be placed on the support pad 230 for testing. Upon the arrangement, the operator squeezes the release lock and presses down on the handle 232 to engage the starter motor and then releases the lock so that the lock is again reengaged. Power leads 228, including, for example, battery lead, ground lead, solenoid lead and sense lead are connected to the starter motor in order to conduct the tests.

In the embodiment depicted in FIG. 2, the tester 200 may incorporate enhanced safety features, such as the protective door cover 222 to enclose moving parts during tests. The protective door cover 222 conceals the belt tensioning arrangement 216, the alternator mounting arrangement 218, the starter motor holder arrangement 220, and other test components, such as an alternator or starter motor. The protective door cover 222 of the tester 200 is shown covering at least the belt tensioning arrangement 216, the alternator mounting arrangement 218, and the starter motor holder arrangement 220 in the closed position.

In the closed position, the protective door cover 222 reduces the likelihood of the possibility of hands getting caught in moving parts or projectiles potentially contacting the end user. The protective door cover 222 may employ a door interlock switch (not shown) to disable tests while the protective door cover 222 is open. Alternatively, the protective door cover 222 may include a viewing window so that the operator can observe the testing components during the tests.

Figure 3:
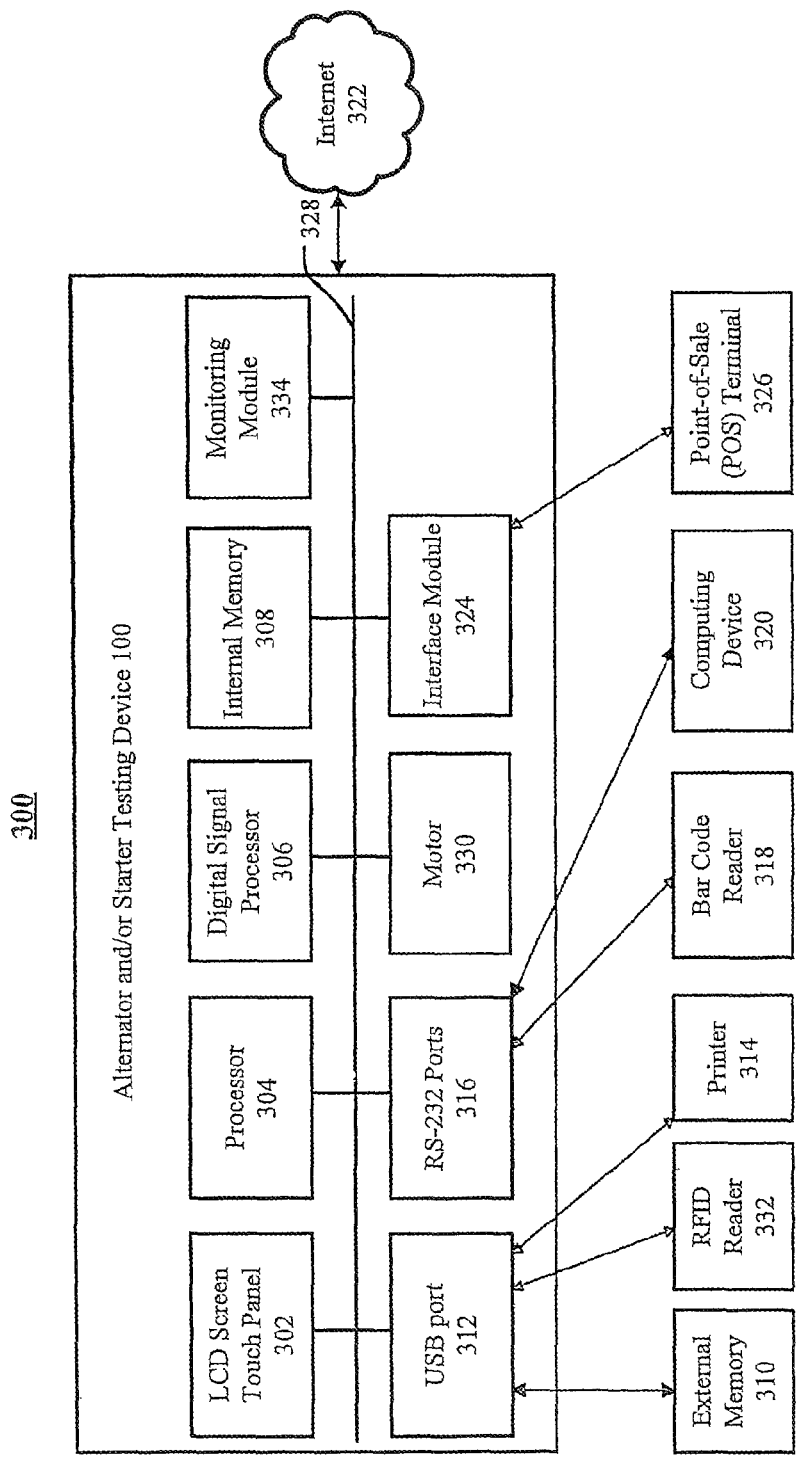
FIG. 3 is a block diagram of the main components of the alternator and starter motor tester according to an exemplary embodiment of the present invention.

FIG. 3 is a block diagram 300 of the components of the alternator and starter motor tester as previously described and shown in FIGS. 1-2 according to an exemplary embodiment of the present invention. The components generally include a monitor screen, such as LCD screen 302 that various information to the user. The LCD screen 302 may be a touch panel to input information as desired by the user and can be controlled by a processor 304. The processor 304 may be any processor or controller, including a FPGA (Field Programmable Gate Array). The processor 304 is capable and runs various OS (Operating System) including Linux, Apple Computer's Operating System (such as OS X), Windows, Windows CE and the like. The processor 304 communicates with a digital signal processor 306, which includes an analog and digital (A/D) converter. The processor 304 communicates with other components (e.g., internal memory 308, USB port 312, RS-232 ports 316, motor 330, interface module 324 and/or monitoring module 334) of the tester 100 via a communication bus 328.

The processor 304 is configured to communicate with an internal memory 308 and an external memory 310. The internal memory 308 and/or the external memory 310 can be any memory including, for example, compact flash, SD (secure digital), USB flash drives, and the like. A universal serial bus (USB) port 312 communicates with the processor 304 and provides a connection for various USB compatible devices, such as, for example, an external memory 310, a printer 314, a radio frequency identification (RFID) reader 332 and/or a diagnostic tool 336. The RFID reader 332 functions to read identifying information about the tested component containing an RFID chip once it is within a detection range. The RFID chip may contain information about the alternator or starter motor such as alternator/starter motor type, serial number, manufacturer, date of production or shipment, previous test results, electrical specifications, maintenance information, serial number, lot number, warranty information, a manufacture data code, method of shipment and the like. Also, the RFID chip may contain information about the test adapter 126 and power leads 128 and/or connection ports of the alternator or starter motor to be tested. In an exemplary embodiment, each of the test adapter 126 and power leads 128 and/or each of the connection ports of the alternator or starter motor to be tested may be equipped with an RFID chip. The identification of the test adapter 126 and/or the power leads 128 and/or connection ports of the alternator or starter motor to be tested may be beneficial to verify that the test adapter 126 and/or the power leads 128 are coupled to the correct connection ports of the alternator or starter motor to be tested.

RS-232 ports 316 also communicate with other external devices, such as a computing device 320, a bar code reader 318 and/or the diagnostic tool 336. The computing device 320 can be any computing device, including a personal computer, a laptop, a personal digital assistant (PDA), a cell phone or the like.

The bar code reader 318 allows the user to scan bar code information that may be attached to the tested component or the VIN (vehicle identification number) of the vehicle from which the tested component came from. The bar code reader 318 may be, for example, a conventional optical bar code reader, such as a gun or wand type reader.

During operation, end user swipes or aims the bar code reader 318 over the bar code that is associated with the particular alternator or starter motor to be tested and reads the bar code accordingly. The bar code itself may be affixed to the alternator or starter motor at the time of manufacture, purchase, shipment or service. The bar code may contain information, or point to information stored in a database. The database may be local or remotely located and accessible by the Internet, Ethernet, Wi-Fi, LAN, Bluetooth or other wireless or a wired connection. The data provided by the bar code is not limited to the examples given. The bar code affixed to the test adapter 126 and/or the power leads 128 may contain information, or point to information stored in a database. The database may be local or remotely located and accessible by the Internet, Ethernet, Wi-Fi, LAN, Bluetooth or other wireless or a wired connection.

The bar code may provide a variety of information regarding the alternator or starter motor to be tested. For example, the bar code may provide information regarding the alternator/starter motor type, serial number, manufacturer, date of production or shipment, previous test results, electrical specifications, maintenance information, serial number, lot number, warranty information, a manufacture data code, method of shipment and the like. This data can be used to select parameters for the test cycle run to test the alternator and starter motor.

The bar code may provide a variety of information regarding the alternator or starter to be tested. For example, the bar code may provide information regarding the alternator/starter type, serial number, manufacturer, date of production or shipment, previous test results, electrical specifications, port connections, electrical configuration/layout, diagnostic specification, maintenance information, serial number, lot number, warranty information, a manufacture data code, method of shipment and the like. The bar code affixed to the test adapter 126 and/or the power leads 128 may provide information regarding pins, electrical characteristics, adapter/lead types, specification and/or other information that may identify the test adapter 126 and/or the power leads 128. The data regarding the alternator or starter and/or the data regarding the test adapter 126 and/or the power leads 128 can be used to select parameters for the test cycle run in the tester 100. The data provided by the bar code is not limited to the examples given.

In some embodiments, the printer 314 may print bar code labels that may be attached or otherwise associated with the alternator or starter and provides updated information about the component. The updated information may include, among other things, service dates, service procedures (including the results), and warranty information (e.g., time left on warranty, who was the original purchaser, what types of service are and are not warranted, etc.). The printed label may then be read by the bar code reader 318 in subsequent tests. These features can eliminate possible typographical errors during manual input and by speeding up part number selection and entry by having a scanning capability.

The present disclosure also has the ability to store and display or print technical bulletins associated with specific part numbers of components to be tested. Printouts of test results can give rebuilders access to data obtained by users to assist in the further analysis of that component.

The processor 304 may also communicate with an interface module 324. The interface module 324 by itself of along with the processor 304 may verify whether the test adapter 126 and or the power leads 128 are coupled to the correct ports of the alternators and starter to be tested. The interface module 324 may identify the test adapter 126 and/or the power leads 128 via an inquiry signal. For example, each test adapters 126 and/or the power leads 128 may have a unique resistive value (e.g., different resistors, as described in detail below). The interface module 324 may generate and transmit an inquiry signal to each of the test adapters 126 and/or the power leads 128. Each test adapters 126 and/or the power leads 128 may respond differently (e.g., different voltage potential and/or current) because of the different resistive values and the interface module 324 may identify the test adapters 126 and/or the power leads 128 based at least in part on the response to the inquiry signals.

The interface module 324 may communicate with external devices coupled to the tester 100. For example, the interface module 324 may communicate with the bar code reader 318 and/or the RFID reader 332. The interface module 324 may receive identification of test adapter 126 and the power leads 128 from the bar code reader 318 and/or the RFID reader 332. In an exemplary embodiment, the interface module 324 may communicate with the bar code reader 318 and receive bar code identification information of the test adapters 126 and/or the power leads 128. In another exemplary embodiment, the interface module 324 may communicate with the MID reader 332 and receive RFID identification information of the test adapters 126 and/or the power leads 128.

The interface module 324 may comprise a database or access the internal memory 308 or the external memory 310 that stores the database) for storing information associated with the tested components and information associated with the diagnostic test performed by the tester 100. The information associated with the tested components may include, but not limited to, alternator/starter type, serial number, manufacturer, date of production or shipment, previous test results, electrical specifications, port connections, electrical configuration/layout, diagnostic specification, maintenance information, serial number, lot number, warranty information, a manufacture data code, method of shipment and the like. The information associated with the diagnostic test performed by the tester 100 may include, but not limited to, test specification, test values, test results (including previous test results), data, time, employee, location, weather condition during testing (extreme cold or heat that may affect the test) and/or any other information associated with the diagnostic test.

The interface module 324 may verify whether the proper test adapters 126 and/or the power leads 128 are coupled to the tested components based at least in part on the information associated with the tested components and/or the identification information of the test adapters 126 and/or the power leads 128. For example, the interface module 324 may automatically compare and contrast whether the proper test adapters 126 and/or the power leads 128 are coupled to the tested components based at least in part on the information of the tested components. In an exemplary embodiment, the interface module 324 may identify each individual test adapters 126 and/or the test leads 128 and may verify whether the test adapters 126 and/or the test leads 128 are coupled to the proper port connection based at least in part on the diagnostic specification of the tested components.

The interface module 324 may provide an indication whether the test adapters 126 and/or the test leads 128 are properly coupled to the tested components. For example, the interface module 324 may provide an error indication when the test adapters 126 and/or the test leads 128 are not properly coupled to the tested components via the LCD screen touch panel 302. Also, the interface module 324 may provide a correct indication when the test adapters 126 and/or the test leads 128 are properly coupled to the tested components via the LCD screen touch panel 302.

The processor 304 may communicate with a monitoring module 334 that may monitor an output of the tested components and/or an input of the tester 100. The monitoring module 334 may monitor an output voltage potential and/or current of the tested components during a test of the alternator and/or starter motor. During testing of the alternator and/or starter motor, the monitoring module 334 may increase an output load (e.g., resistance) coupled to the output of the tested alternators and/or starter motor in order to improve an accuracy of the diagnostic test. For example, the tester 100 may include a first load (e.g., normal load) and a second load (e.g., additional load) that may be coupled to the output of the tested alternator and/or starter motor (as described in detail below). The monitoring module 334 may test the alternator and/or the starter motor using the normal load and may increase the output load coupled to the tested alternator and/or starter motor by coupling the additional load. The additional load coupled to the output of the tested alternator and/or starter motor may detect additional defects that may not be detected using the normal load. In an exemplary embodiment, with the addition of the additional load coupled to the output of the tested alternator and/or starter motor extra voltage potentials and/or currents may flow through the tested alternator and/or starter motor in order to more accurately simulate the actual operation of the tested alternator and/or starter motor and thus improves the accuracy of the diagnostic test.

The monitoring module 334 may verify whether the tested components is operating properly based at least in part on the output voltage potential and/or current of the tested components. For example, the monitoring module 334 may detect the output voltage potential and/or current of the tested components and determine whether the detected output voltage potential and/or current matches an expected voltage potential and/or current stored in a data of either the internal memory 308 or the external memory 310.

The monitoring module 334 may also monitor an input voltage potential and/or current of the tester 100 during the diagnostic test. For example, when the additional load is coupled to the output of the tested alternator and/or starter motor, additional power may be drawn by the tester 100 from the external power source (e.g., A/C power source). The additional power may not be applied for a long period of time due to safety reasons, and thus the monitoring module 334 may monitor the input voltage potential and/or current of the tester 100 in order to remove the additional load in time so that the additional power does not exceed a threshold time period. For example, the threshold time period may be determined based at least in part on a power rating of the tester 100 and/or safety standards.

The processor 304 can also interact with a networked computer, LAN (local area network), a smartphone, cellular phone or a distributed network, such as the Internet 322 and the like. This connection allows the user to update the tester 100 and also send information regarding the test results to a remote location. The information sent or received can include, software, firmware, language, weather reports and database for the components to be tested or to the tester 100.

A motor 330 is also provided in order to test alternators. Motor 330 can simulate the engine of a vehicle and includes a pulley to mate with a belt. At one end, the belt is coupled to the motor's 330 pulley and at the other end is coupled to the pulley of the alternator to be tested.

Figure 4:
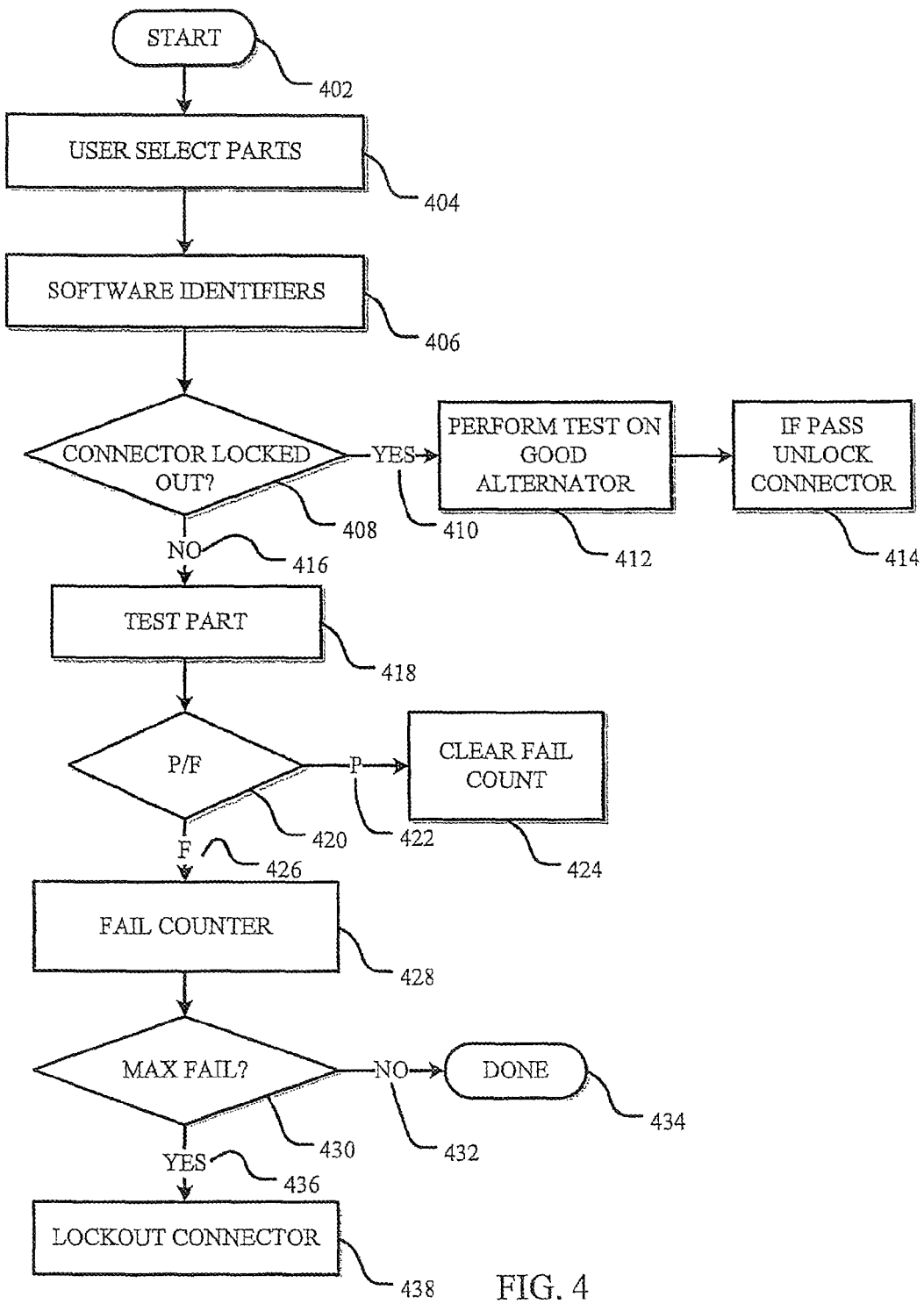
FIG. 4 illustrates an alternator cable check method according to an exemplary embodiment of the present invention.

FIG. 4 illustrates a method 400 for checking an alternator cable according to an embodiment of the present invention. Currently there is no effective way of verifying that a test adapter 126 used to test an alternator is actually a good test adapter 126. This inability to verify the tested adaptor may lead to, failing a good component because of defective test leads. Moreover, an incorrect test response may lead to improperly paying a warranty claim. Because there are many different alternators with many different mechanical style electrical connectors, providing a conventional matting connector to conduct a loop-back test would not be a convenient or economical solution. To overcome this problem, software is provided to keep track of the number of times in sequence the tester 100 fails an alternator, which uses a specific test adapter 126. The software keeps track of how many times a specific test adapter 126 has failed sequentially when used with that type of alternator. If a preset number of failures are met, then software will "lock out" that specific test adapter 126 so that it cannot be used in later testing. The operator can enable the "locked" test adapter 126 by getting a known good alternator and re-running a test. If the test passes (i.e., the test adapter 126 is actually good), then the test adapter 126 can be re-enabled and be used in future tests.

Turning back to FIG. 4, starting at step 402, the user selects the component or the part to test at step 404 through an input device, such as the LCD screen 302 or the bar code or RFID chip. At step, 406, the software identifies the proper test adapter 126 to the user. In the case of an alternator, the alternator test adapter 126 is identified for the user. At step 408, the software detects whether the alternator test adapter 126 is "locked out." This may be done through sensing the alternator test adaptor 126 through, for example, the bar code, RFID chip and/or resistor on the alternator connector. That is, the software will not allow the alternator to be tested with that test adapter 126. If an acknowledge to proceed or "yes" is received at step 410, then the user is instructed via the LCD screen 302 to perform a test with the test adapter 126 on a good (known) alternator at step 412. If the test adapter 126 passes, then the software "unlocks" the test adapter 126 at step 414. When the test adapter 126 is unlocked, it can again be used to test alternators. If the test adapter 126 fails, then the test adapter 126 remains "locked."

Referring back to step 408, if the test adapter 126 is not locked at step 416, then the tester 100 proceeds to test the component or part at step 418. At step 420, the software will note whether the alternator passes or fails. If pass, at step 422, then clear any fail counts for this specific test adapter 126 at step 424. If the alternator fails at step 426, then an increment counter is started for this specific test adaptor 126 at step 428.

At step 430, the software determines whether or not the test adapter 126 has failed for a certain number of times. The number of times can be determined by the user and can range, for example, from 1-5, from 1-7, and another ranges desired by the user. If the maximum limit has not been reached, at step 432, then the method 400 may end at step 434 until the next test. If the maximum limit has been reached, at step 436, then the alternator test adaptor 126 is locked out at step 438. When the test adapter 126 is locked out, it can be discarded or returned to the manufacturer. As stated above, the alternator test adapter 126 can be "unlocked" if it passes another test using a good alternator. This method prevents the user from continue to use bad test adaptors 126 that may provide inaccurate test results. Additionally, this method can also prevent good test adaptors 126 from being discarded unless it fails a certain number of times.

Figure 5:
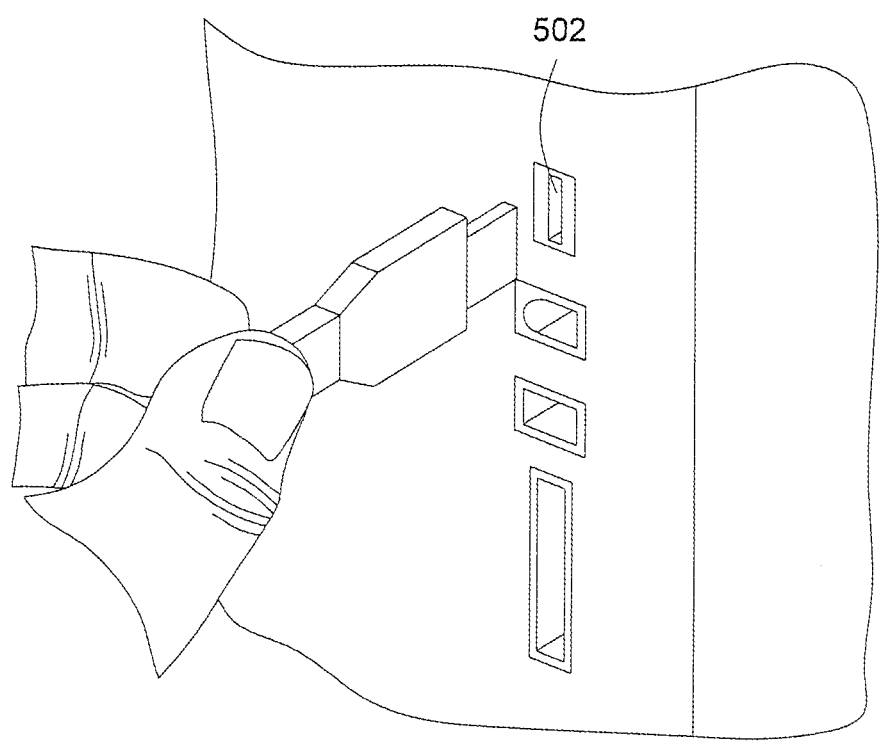
FIG. 5 is a perspective view of the peripheral and remote connections of the alternator and starter motor tester according to an exemplary embodiment of the present invention.

Referring to FIG. 5, in some embodiments of the alternator and starter motor tester, network connectivity may be used to track tests based on part number, employee and location in order to improve accuracy of the diagnostic test. The large-scale communication network ports can be constructed and arranged to receive an information relay device, such as an Ethernet wired module and/or an Ethernet wireless module. The Ethernet modules communicate at data rates of 10 Mbps (10Base-T Ethernet), 100 Mbps (Fast Ethernet), 1000 Mbps (Gigabit Ethernet) and other data rates. The information relayed can include data from the result of an alternator or starter test, the part's warranty information, the part type, the part make and model, previous tests, updates, diagnostic or operating parameters of the alternator and starter tester, maintenance data of the alternator and starter tester, and any other data required by the operator.

Referring to FIG. 5, in some embodiments, peripheral module ports 502 may be used to communicate to various peripheral devices such as a mouse, a keyboard, or a printer as well as to receive updates and/or downloads from a connected device such as a laptop or personal computer. The peripheral module ports 502 may be a USB module having ports for a host connection and a function connection. The USB module may communicate as USB 1.1 or USB 2.0, 3.0 or other data rates. The host connection racy accommodate a mouse, a keyboard, or a printer. The function connection may accommodate a laptop or personal computer.

Figure 6:
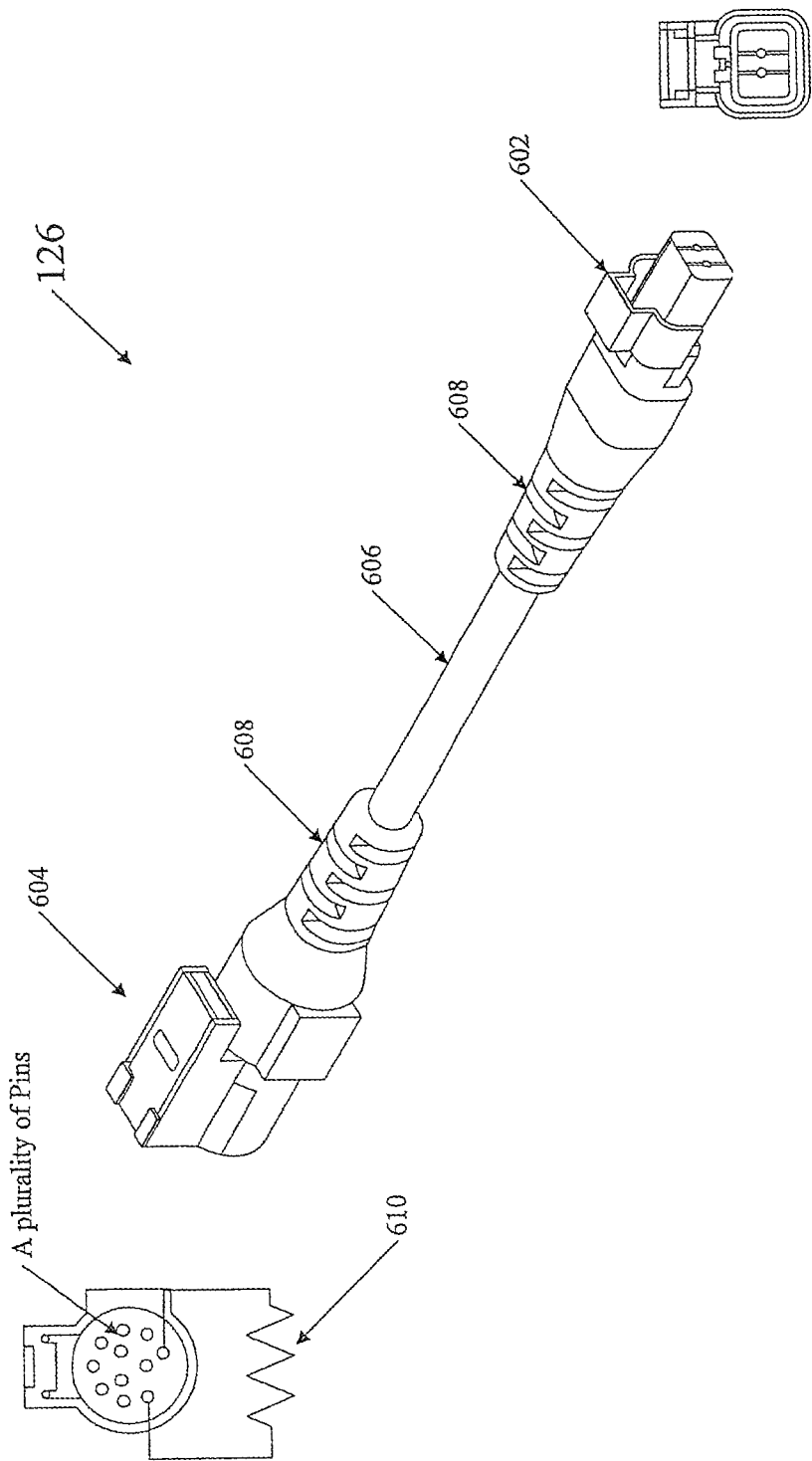
FIG. 6 is a perspective view of a test adapter or power lead of the alternator and starter motor tester according to an exemplary embodiment of the present invention.

FIG. 6 illustrates a test adapter 126 of the alternator and starter motor tester 100 according to an exemplary embodiment of the present invention. The test adapter 126 may comprise a first connector 602 and a second connector 604 coupled to each other via a cable 606. The cable 606 may be coupled to the first connector 602 and the second connector 604 via over mold portions 608. The over mode portions 608 of the cable 126 may provide strain relief of the first connector 602 and the second connector 602 in order to prevent damages of the connections. The first connector 602 may be coupled to the tested components (e.g., alternator) and the second connector 604 may be coupled to the tester 100.

The first connector 602 and the second connector 604 may be the same type of connectors or different types of connectors. In an exemplary embodiment, the first connector 602 may be a connector that may comprise a plurality of pins and the second connector 604 may be a P1 power connector. In an exemplary embodiment, the second connector 604 may comprise eleven (11) pins. A resistor 610 having a resistive value may be coupled to one or more pins of the second connector 604. In an exemplary embodiment, the resistor 610 may be coupled to two pins of the second connector 604. In another exemplary embodiment, the resistor 610 may be coupled to three pins of the second connector 604. The resistor 610 for each of the test adapters 126 and/or the power leads 128 may be different in order to identify each individual test adapters 126 and/or the power leads 128.

Figure 7:
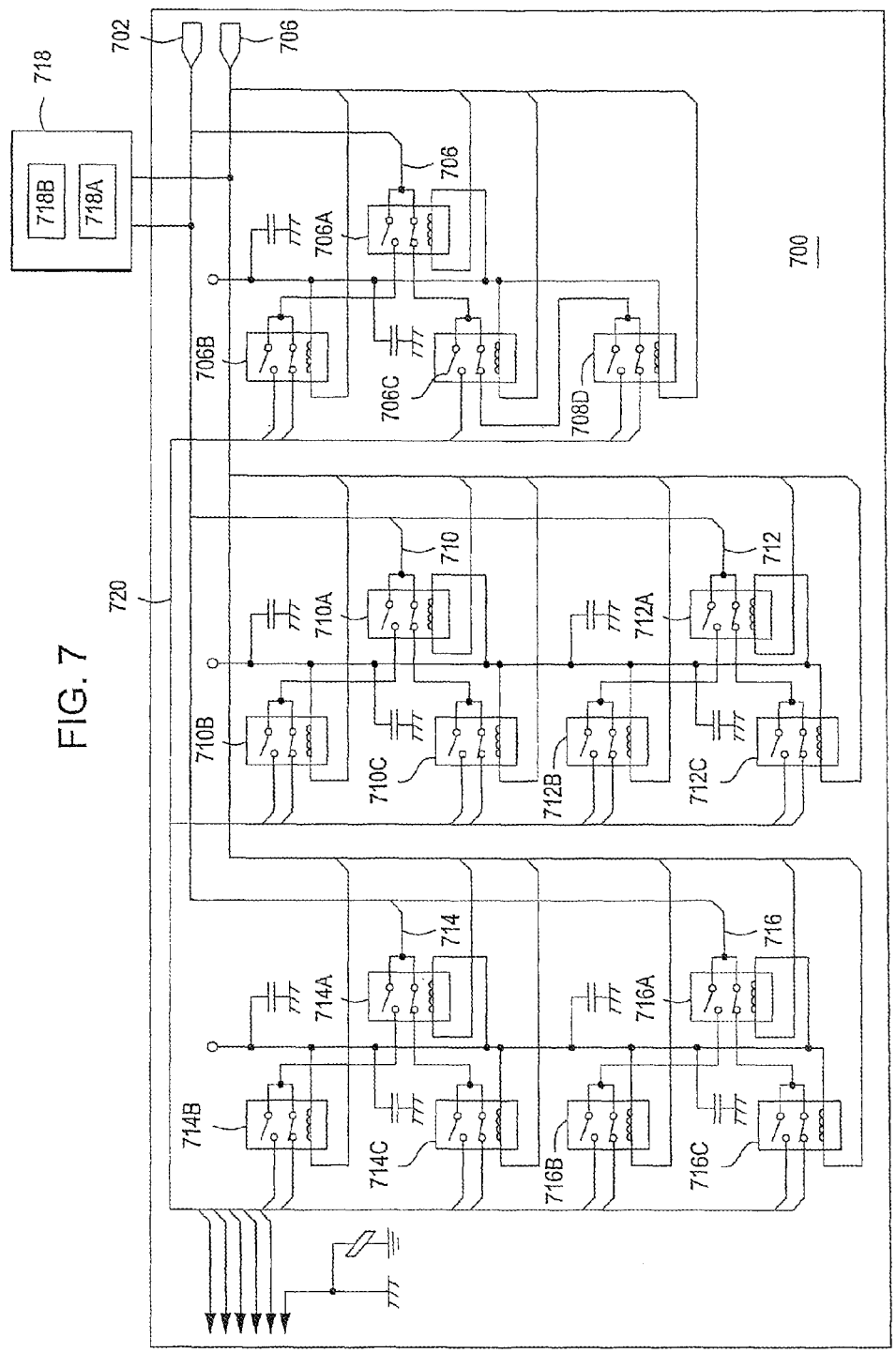
FIG. 7 illustrates a multiplexing circuitry having a variable resistive load of the alternator and starter motor tester according to an exemplary embodiment of the present invention.

FIG. 7 illustrates an embodiment of the present invention having multiplexing capabilities. The multiplexer 700 generally includes various test components for an alternator system, such as ignition 706, stator 710, sense 712 (battery+ signal), lamp 714, and field driver signal 716. A person skilled in the art would recognize that the multiplexer can receive any signal from the component under test as desired by the user. Alternator cable 702 and relay cable 704 can be connected to a printed circuit board in the tester 100 or any other place on the tester 100 as desired. The multiplexing system 700 includes software that controls the various relays and the signal received during testing from the alternator based on the type or model of the alternator. Although described for an alternator, the multiplexer can be used with the starter motor.

The relay cable 704 can control the various switches depending on the desired pin from which the test signal is to be received. Ignition 706 includes four switches 706A, 706B, 706C, and 706D, which allows signals to be received from five pins instead of having three switches that may receive signal from four pins. As ignition 706 is shown, the switches 706A, 706B, 706C, and 706D are set so that signals from pin 5 of the connector that may be connected to the alternator are received by the tester 100. If the ignition signal is on pin 1, then the software will command switch 706A to connect at the top gate (3,4) and disconnect at the bottom gate (5,6) and command switch 706B to connect at the top gate (3,4) and disconnect at the bottom gate (5,6).

Stator 710 includes three switches 710A, 710B, and 710C that allow access to four pins. As stator 710 is shown, the switches 710A, 710B, and 710C are set so that signals from pin 3 of the connector that may be connected to the alternator are received by the tester 100. Sense 712 includes three switches 712A, 712B, and 712C that allow access to four pins. As sense 712 is shown, the switches 712A, 712B, and 712C are set so that signals from pin 4 of the connector that may be connected to the alternator are received by the tester 100.

Lamp 714 includes three switches 714A, 714B, and 714C that allow access to four pins. As lamp 714 is shown, the switches 714A, 714B, and 714C are set so that signals from pin 1 of the connector that may be connected to the alternator are received by the tester 100. Field driver signal 716 includes three switches 716A, 716B, and 716C that allow access to four pins. As field driver signal 716 is shown, the switches 716A, 716B, and 716C are set so that signals from pin 2 of the connector that may be connected to the alternator are received by the tester 100.

During operation, the user can input the information (type, model number, etc.) regarding the alternator under test through an input device, such as the LCD screen 302 or other input devices and the tests that are to be conducted. Based on the information inputted, the software can configure the multiplexing circuits and so that signals from the right pin will be received by the tester 100. For example, if the sense signal from the alternator under test will be on pin 1, then the software can instruct, via relay cable 704, for switch 712A to connect top gate (3,4) and disconnect bottom gate (5,6), and for switch 712B to connect top gate (3,4) and disconnect bottom gate (5,6). This will allow signals at pin 1 to be received at the sense 712. The multiplexer 700 can have as many switches as needed and is not limited to the ones shown. For example, there can be 1 to 2 switches or 5 to 8 or more switches.

In other embodiments, the multiplexing software can verify the instruction inputted by the user and performs a series of safety checks before performing any multiplexing actions. For example, some potentially dangerous requests by the user will be declined by the software, such as a request from user to connect B+(sense) directly to the field circuit of an alternator. The software can also protect the tester 100 by probing some voltages on the alternator to detect any fatal problem with the alternator. For example, some signal pins on the alternator may be already shorted to ground. Thus, the software will not perform any multiplexing action in order to avoid shorting the tester circuit to ground.

The alternator cable 702 and the relay cable 704 may be coupled to a variable load 718 in order to detect an output voltage potential and/or an output current of the tested component. The variable load 718 may comprise a plurality of resistive loads 718A and 718B that may be selectively coupled (e.g., via a switch) to the alternator cable 702 and the relay cable 704. The variable load 718 may have a resistive value in order to detect defects within tested components. In an exemplary embodiment, the resistive load 718A may be used a default load in order to test the components. Resistive load 718B may be added to the resistive load 718A in order to increase the resistive value of the variable load 718. The increase of the resistive value of the variable load 718 may lead to an increase in the accuracy of the diagnostic test performed by the tester 100 by more accurately simulating the actual operation of the tested components.

The resistive value of the variable load 718 may vary depending on whether the resistive load 718B is added to the default resistive load 718A. The resistive value of the variable load 718 may depend on an electrical rating of A/C power at the location of the tester 100. In an exemplary embodiment, the resistive load 718A may be rated for 10-15 Amperes. The resistive load 718B may be rated for 5-10 Amperes. The resistive load 718B may be coupled to or decoupled from the resistive load 718A by the monitoring module 334. The monitoring module 334 may monitor an amount of time the resistive load 718B is coupled to the resistive load 718A and the output voltage potential and/or the output current at the variable load 718.

Figure 8:
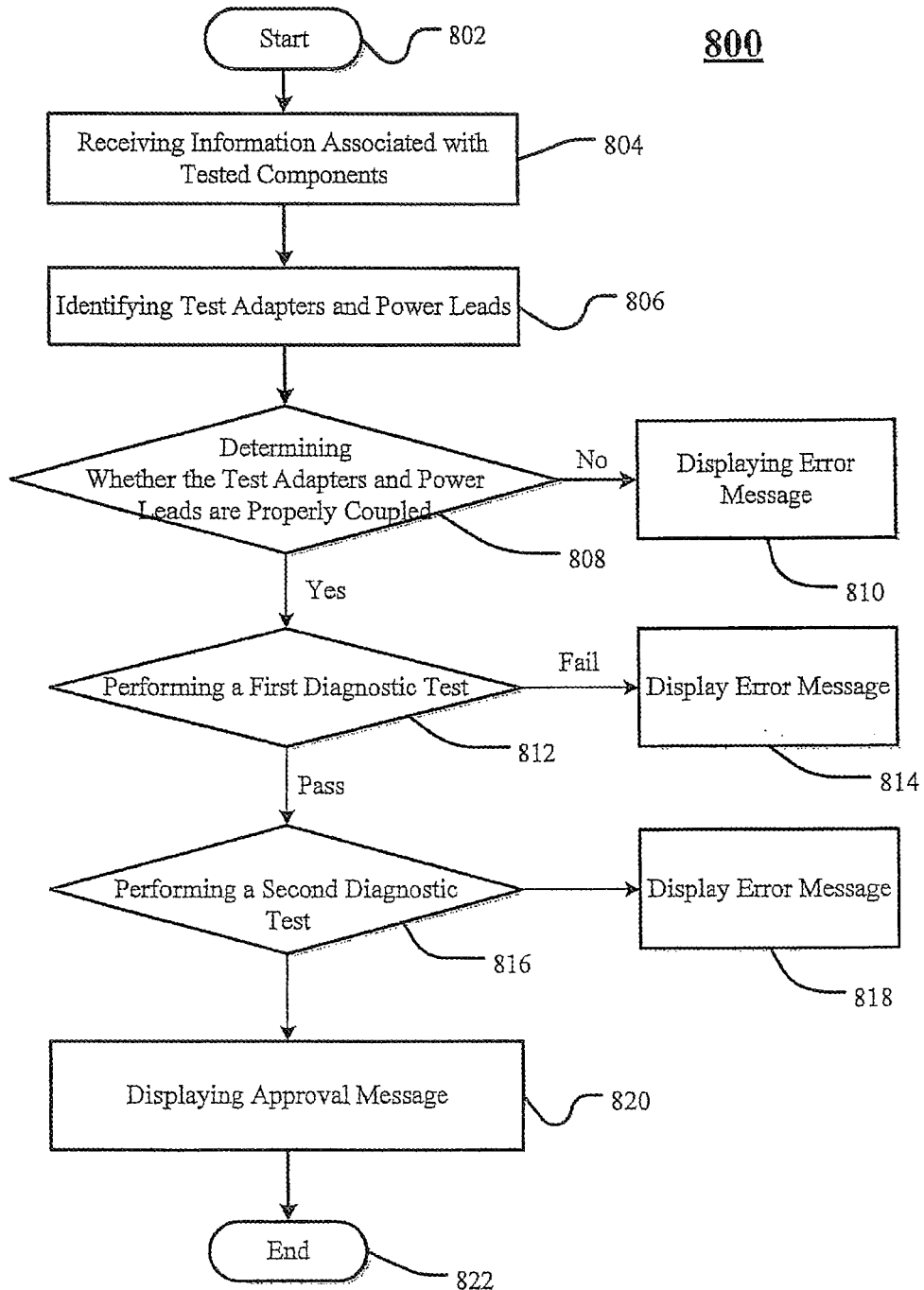
FIG. 8 illustrates a method of testing an alternator or starter motor according to an exemplary embodiment of the present invention.

FIG. 8 illustrates a method 800 for performing a diagnostic test by the alternator and starter motor tester 100 according to an exemplary embodiment of the present invention. This exemplary method 800 may be provided by way of example, as there are a variety of ways to carry out the method. The method 800 shown in FIG. 8 can be executed or otherwise performed by one or a combination of various systems. The method 800 is described below may be carried out by the system and networks shown in FIGS. 1-7, by way of example, and various elements of the system and network are referenced in explaining the exemplary method of FIG. 8. Each block shown in FIG. 8 represents one or more processes, methods, or subroutines carried out in exemplary method 800 and the steps are not limited to the order shown in the figure. Referring to FIG. 8, exemplary method 800 may begin at step 802.

At step 802, the method 800 for performing a diagnostic test of tested components (e.g., an alternator or a starter motor) may begin. At step 804, information associated with the tested components may be received. For example, a problem or a failure of a vehicle may arise and an alternator or a starter motor may be tested to determine whether it is operating properly. The alternator or the starter motor may be taken to the tester 100 for diagnostic tests. The information associated with the alternator or the starter motor may be inputted into the tester 100 manually via the LCD screen touch panel 302 or scanned in/read through the bar code reader 318 or RFID reader 332. For example, a user may manually input the parts number, model, make, year and/or any other information associated with the alternator or starter via the LCD screen touch panel 302.

The information associated with the tested components may be automatically received. For example, the bar code reader 318 may scan the alternator or the starter motor to be tested to identify parts number, model, make, year and/or other information associated with the alternator or starter. Also, the RFID reader 332 may read the RFID chip associated with the alternator or the starter motor to be tested in order to identify parts number, model, make, year and/or other information associated with the alternator or starter motor. The bar code reader 318 and/or the RFID reader 332 may automatically transmit the information associated with the alternator or the starter motor to the tester 100 via the RS-232 ports 316. Also, the information associated with the alternator or the starter motor may be automatically transmitted to the tester 100, when the diagnostic tool 336 is coupled to the tester 100. After receiving information associated with the test components, the method 800 may proceed to step 806.

At step 806, test adapter 126 and power leads 128 may be identified. The interface module 324 may identify the test adapter 126 and the power leads 128 via a unique resistive value (e.g., different resistors, as shown in FIG. 6). The interface module 324 may generate and transmit an inquiry signal to each of the test adapters 126 and/or the power leads 128. Each test adapters 126 and/or the power leads 128 may respond differently (e.g., different voltage potential and/or current) because of the different resistive values and the interface module 324 may identify the test adapters 126 and/or the power leads 128 based at least in part on the response to the inquiry signals.

External devices may identify the test adapters 126 and power leads 128 and may provide the identification information to the tester 100. For example, the bar code reader 318 may scan the test adapters 126 and the power leads 128 to identify the different test adapters 126 and power leads 128. Also, the RFID reader 332 may read the RFID chip associated with each of the test adapters 126 and the power leads 128 to identify the different test adapters 126 and power leads 128. The bar code reader 318 and/or the RFID reader 332 may automatically transmit the identification of the test adapters 126 and power leads 128 to the tester 100 via the RS-232 ports 316. After identifying power adapters 126 and power leads 128, the method 800 may proceed to step 808.

At step 808, whether the test adapters 126 and power leads 128 are properly coupled to the tested components may be determined. The interface module 324 may determine whether the test adapters 126 and power leads 128 are properly coupled to the tested components based at least in part on the information of the tested components and the identification of the test adapters 126 and power leads 128. For example, the interface module 324 may access the internal memory 308 or the external memory 310 in order to obtain specification and configuration of the tested components based at least in part on the information of the tested components. In an exemplary embodiment, the specification and configuration of the tested components may include resistive values of the test adapters 126 and power leads 128 for performing the diagnostic test. The interface module 324 may match the unique resistive value of each of the test adapters and power leads 128 with the stored specification and configuration of the tested components.

In another exemplary embodiment, the specification configuration of the tested components may include bar code information and/or RFID chip information of the test adapters 126 and power leads 128 for performing the diagnostic test. The interface module 324 may match the bar code information and/or RFID chip information of each of the test adapters 126 and power leads 128 with the stored specification and configuration of the tested components. In the event that the test adapters 126 and power leads 128 are determined to be improperly coupled to the tested components, the method 800 may proceed to step 810. In the event that the test adapters 126 and power leads 128 are determined to be properly coupled to the tested components, the method 800 may proceed to step 812.

At step 810, an error message may be displayed to a user. For example, the LCD screen 302 may display an error message to the user when the test adapters 126 and power leads 128 are improperly coupled to the tested components. The error message may include an indication of which test adapters 126 and/or power leads 128 are improperly connected to the tested components in order for the user to correct the connection.

At step 812, a first diagnostic test may be performed. The tester 100 may perform the first diagnostic test using the default resistive load 718A. The tester 100 may determine whether the tested alternator or the starter is operating properly using the default resistive load 718A. The internal memory 308 of the tester 100 may store the information associated with the diagnostic tests and their results. The monitoring module 334 may monitor the output voltage potential and/or the output current of the default resistive load 718 in order to determine whether the tested alternator or starter motor is operating properly. The monitoring module 334 may compare the detected output voltage potential and/or output current with the expected diagnostic test results. In the event that the tested alternator or the starter fails the first diagnostic test, the method 800 may proceed to step 814. In the event that the tested alternator or the starter passes the diagnostic test, the method 800 may proceed to step 816.

At step 814, an error message may be displayed to a user that the tested alternator or starter motor failed the diagnostic test. For example, the LCD screen 302 may display an error message to the user that the tested alternator or starter motor failed the first diagnostic test. The error message may include a cause of the failure of the tested alternator or starter motor.

At step 816, a second diagnostic test may be performed. The tester 100 may perform the second diagnostic test using the default resistive load 718A and the additional resistive load 718B. The tester 100 may determine whether the tested alternator or the starter is operating properly using the default resistive load 718A and the additional resistive load 718B. The internal memory 308 of the tester 100 may store the information associated with the second diagnostic tests and their results. The monitoring module 334 may monitor the output voltage potential and/or the output current of the default resistive load 718A and the additional resistive load 718B in order to determine whether the tested alternator or starter motor is operating properly. The monitoring module 334 may compare the detected output voltage potential and/or output current with the expected diagnostic test results. In the event that the tested alternator or the starter fails the second diagnostic test, the method 800 may proceed to step 818. In the event that the tested alternator or the starter passes the diagnostic test, the method 800 may proceed to step 820.

At step 818, an error message may be displayed to a user that the tested alternator or starter motor failed the second diagnostic test. For example, the LCD screen 302 may display an error message to the user that the tested alternator or starter motor failed the first diagnostic test. The error message may include a cause of the failure of the tested alternator and starter motor.

At step 820, an approval message may be displayed to a user that the tested alternator or starter motor passed the second diagnostic test. For example, the LCD screen 302 may display an approval message to the user to indicate that the tested alternator or starter motor is operating properly. After displaying an approval message to the user, the method 800 may end at step 822.

The many features and advantages of the present disclosure are apparent from the detailed specification, and thus, it is intended by the appended claims to cover all such features and advantages of the present disclosure, which fall within the true spirit, and scope of the present disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

What is claimed is:

1. A diagnostic tool configured to testing the performance of a component of a vehicle, the diagnostic tool comprising:
   a processor configured to process test information from an alternator component of the vehicle and control and activate the alternator component of the vehicle having identification information;
   a memory configured to store the test information of the alternator component and software that operates the diagnostic tool;
   an interface module in communication with the processor and configured to determine an identification element that has a unique resistive value; and
   at least one test adapter and power lead comprising the identification element, and is adapted to be coupled to the alternator component, wherein the memory and the at least one test adapter and power lead are in communication with the processor, and wherein the unique resistive value is determined by the interface module sending an inquiry signal to the at least one test adapter and power lead.

2. The diagnostic tool of claim 1, wherein said processor is also configured to control and activate a starter motor component of the vehicle and process starter motor information.

3. The diagnostic tool of claim 1, wherein the identification element of the at least one test adapter and power lead further includes at least one of a bar code and a RFID chip.

4. The diagnostic tool of claim 1, further comprising a resistor that is coupled to at least two pins of the at least one test adapter and power lead.

5. A method of testing of a component of a vehicle, comprising the steps of:
   identifying, with an interface module of a tester, a cable connected to an alternator component, wherein the interface module sends an inquiry signal to determine a unique resistive value of the cable;
   activating, with a motor within the tester, the alternator component to generate test information;

processing, with a processor of the tester, the test information from the alternator component of the vehicle;

receiving, with a memory of the tester that is in communication with the processor, the test information associated with the alternator component of the vehicle via an input device; and performing, via software and the processor, a diagnostic test on the alternator component, wherein performing the diagnostic test comprises:

applying a first voltage potential with a first resistive load to the alternator component; and applying a second voltage potential with a second resistive load coupled to the first resistive load to the alternator component, wherein the first voltage potential and the second voltage potential are different.

6. The method according to claim 5, further comprising the steps of:

activating, with a power lead of the tester, a starter motor component to generate test information; and performing, via software and the processor, a diagnostic test on the starter motor component.

7. The method according to claim 5, further comprising verifying, with the interface module that is in communication with the processor, whether the at least one test adapter and power lead is correctly coupled to the alternator component.

8. The method of claim 7, wherein the step of verifying comprises reading, with a reader of the tester, an identification element of the at least one test adapter and power lead.

9. The method of claim 8, wherein the identification element of the at least one test adapter and power lead comprises at least one of a bar code, a RFID chip and a resistor.

10. A diagnostic tool for testing the performance of a component of a vehicle, comprising:

means for processing test information from an alternator component or a starter motor of the vehicle, the means for processing, controlling, and activating the alternator component or the starter motor of the vehicle having identification information;

means for storing the test information of the alternator component or the starter motor component and software that operates the alternator component or the starter motor component of the vehicle;

an interface module in communication with the means for processing and configured to determine an identification element that includes a unique resistive value; and means for coupling comprising the identification element and is capable of being coupled to the alternator component or the starter motor component, and wherein the means for storing and the means for coupling are in communication with the means for processing, and wherein the unique resistive value is determined by the interface module sending an inquiry signal to the means for coupling.

* * * * *